UNITED STATES PATENT OFFICE.

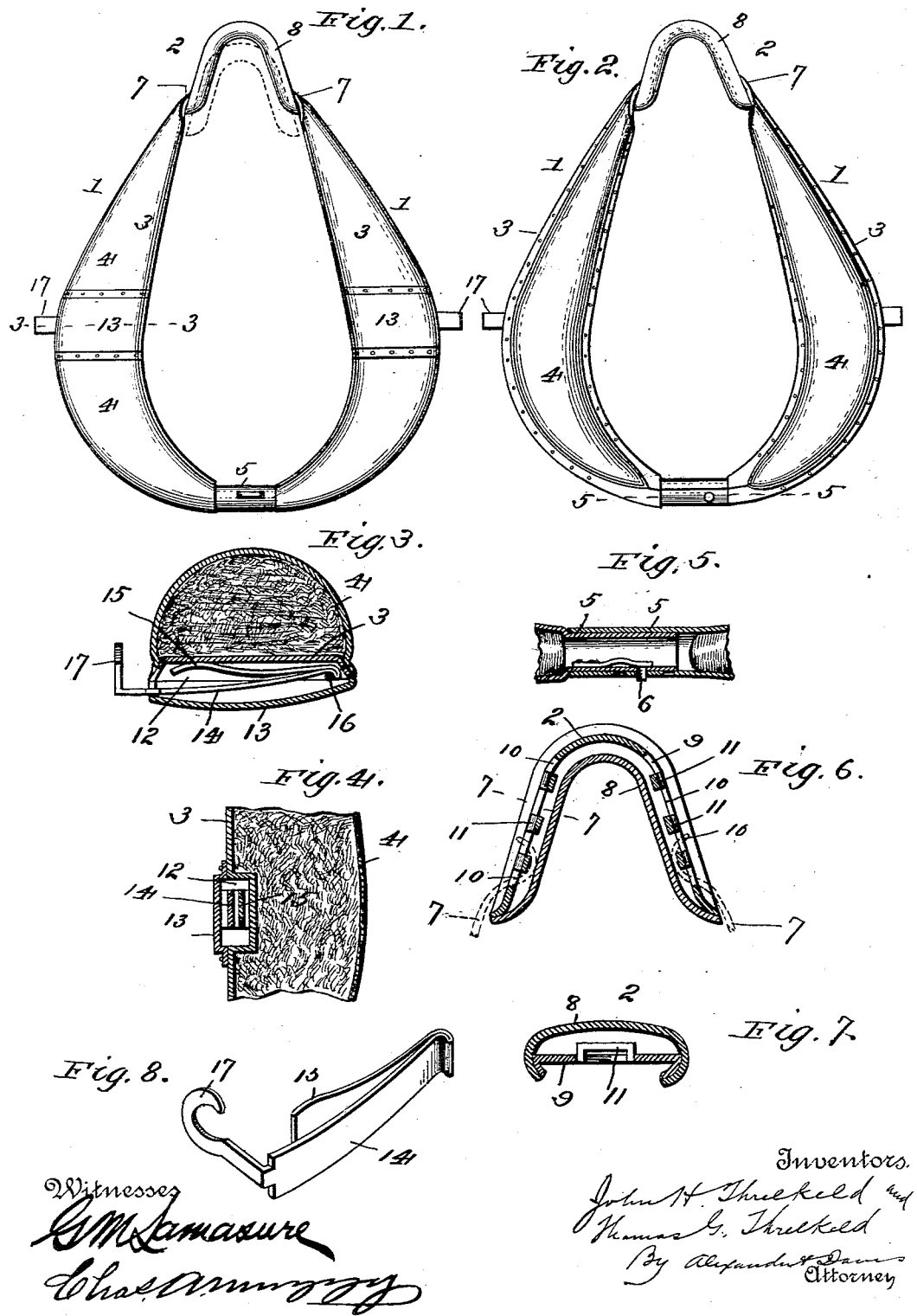

JOHN H. THRELKELD AND THOMAS G. THRELKELD, OF COOL, IOWA.

HORSE-COLLAR.

SPECIFICATION forming part of Letters Patent No. 557,722, dated April 7, 1896.

Application filed January 28, 1896. Serial No. 577,131. (No model.)

*To all whom it may concern:*

Be it known that we, JOHN H. THRELKELD and THOMAS G. THRELKELD, citizens of the United States, residing at Cool, in the county of Warren and State of Iowa, have invented certain new and useful Improvements in Hameless Horse-Collars, of which the following is a specification, reference being had therein to the accompanying drawings.

In the drawings, Figure 1 is a front elevation of the collar; Fig. 2, a rear elevation thereof; Fig. 3, a transverse section on the line 3 3 of Fig. 1; Fig. 4, a detail vertical section on the line 4 4 of Fig. 1; Fig. 5, a horizontal section on the line 5 5 of Fig. 2; Fig. 6, a detail vertical section of the neck-pad; Fig. 7, a detail section on the line 7 7 of Fig. 6, and Fig. 8 a detail perspective view of the tug-hook and its spring.

This invention relates to that class of horse-collars in which the use of separate hames is avoided, the trace-tugs being connected directly to the collar; and its object is to produce a light, strong, and durable collar which may be adjusted to horses of different sizes, as more fully hereinafter set forth.

Referring to the drawings by numerals, 1 designates the two separable sections of the collar, connected detachably at their lower ends by suitable devices, and also at their upper ends by the neck-pad 2. Each section is formed with a facing 3 of sheet metal, provided with the usual breast-pads 4, the edges of the leather of the pad being suitably secured to the edges of the plates. The lower end of each plate 3 curves inward and is formed into a hollow cylindrical extension 5, one of which fits snugly within the other and is locked therein by a suitable latch device 6, whereby the lower ends of the collar-sections are strongly but detachably connected together. The upper ends of the metal plates are curved slightly inward and then outward to form the oppositely-turned hooks 7. The neck-pad consists of two plates 8 and 9, the inner one being formed of zinc and the outer one of any suitable metal, and both being bent into the usual inverted-U form. The inner plate 8 has its longitudinal edges curved outward, so that it presents nothing but rounded surfaces to the animal's neck. The outer plate 9 fits down between the outturned edges of the inner plate and is provided with a series of horizontal slots 10 on opposite sides of the center of the pad, these horizontal slots being separated by cross-bars 11, under which the respective hooks 7 engage, as shown most clearly in dotted lines in Fig. 6, the cross-bars being depressed into the space between the two plates 8 and 9 in order that the ends of the hooks shall not project out beyond the longitudinal edges of the plates. By this construction it will be observed that the neck-pad may be adjusted up and down to suit different-sized animals without the use of straps or bolts or similar contrivances.

About the middle of each section of the collar is formed a transverse box-like depression 12 in the face of the metal plates, each of these boxes being covered by plate 13, whose horizontal edges are fastened to the main plate by suitable screw-bolts, these plates being removable to permit access to the box for repairing or removing the springs inclosed therein. In each of these boxes is confined a pair of strong flat springs 14 and 15, the springs extending transversely of the collar-sections and being secured together at their inner ends and hooked under a vertical bolt or pin 16 secured transversely of the box. The under spring 15 rests against the bottom or forward side of the box and the outer or forward spring is pressed normally forward against the cover-plate. The outer end of the outer spring 14 works through a horizontal slot formed in the meeting edges of the cover and box, and its projecting portion is turned backward and formed into a hook 17, to which the trace-tug is attached. This arrangement forms a very strong but resilient connection between the traces and the collar.

It will be observed that the under spring 15 has a compound curvature, so that it does not lie flat against the inner wall of the box. The object of this is that when the draft is sufficient to bring the two springs in contact they will not abut unyieldingly against the box but will still afford a resilient abutment, which will not be destroyed unless the draft is sufficient to entirely flatten out the under spring. This arrangement of springs, when incased in a transverse box in the face of the collar, substantially as shown, is very advantageous, since the parts are all protected yet remain easy of access, and the wear and rattling are reduced to a minimum.

It will be observed that the peculiar arrangement of the neck-pad enables it to be adjusted up and down within the collar-sections without changing the general form of the neck-opening in the collar, and that as the pad is raised or lowered the collar-sections are spread apart or brought closer together by reason of the outward inclination of the depending sides of the pad.

Having thus fully described our invention, what we claim is—

1. In a horse-collar, the combination of a pair of metal face-plates provided with the breast-pads and connected detachably together at their lower ends and having outwardly-turned hooks at their upper ends, and a neck-pad consisting of two plates 8 and 9 fastened together along their longitudinal edges and bent into an inverted-U shape, the inner plate having its longitudinal edges turned outward, and the outer plate being provided on each depending side with a series of openings, the hooks on the face-plates adapted to engage under said bars, as and for the purposes set forth.

2. In a horse-collar, the combination, of a pair of collar-sections provided with outwardly-turned hooks at their upper ends, and a neck-pad fitting between the upper ends of said collar-sections and having a substantially inverted-U shape, the depending sides being spread outward, said depending parts having openings in the faces of their outer sides in which are adapted to engage the hooks on the collar-sections, substantially as described.

3. A horse-collar formed of two sections, each section consisting of a face-plate of metal and a breast-pad, a transverse box in the face of each section, a transverse flat spring in each of said boxes, working in a horizontal opening in the outer end of said box and carrying a trace-hook on its projecting end, substantially as described.

4. A horse-collar formed of two sections, each section consisting of a face-plate of metal and a breast-pad, each of said sheet-metal faces having formed in it a transverse depression about midway its length, a removable cover-plate covering each of said depressions, a pair of flat steel springs arranged horizontally in said depressions, one of said springs being extended out through the box at the outer edge and provided with a hook for the trace-tug, substantially as described.

In testimony whereof we affix our signatures in presence of two witnesses.

JOHN H. THRELKELD.
THOS. G. THRELKELD.

Witnesses:
C. D. DAVIS,
CHAS. A. MUZZY.